Figure 1:
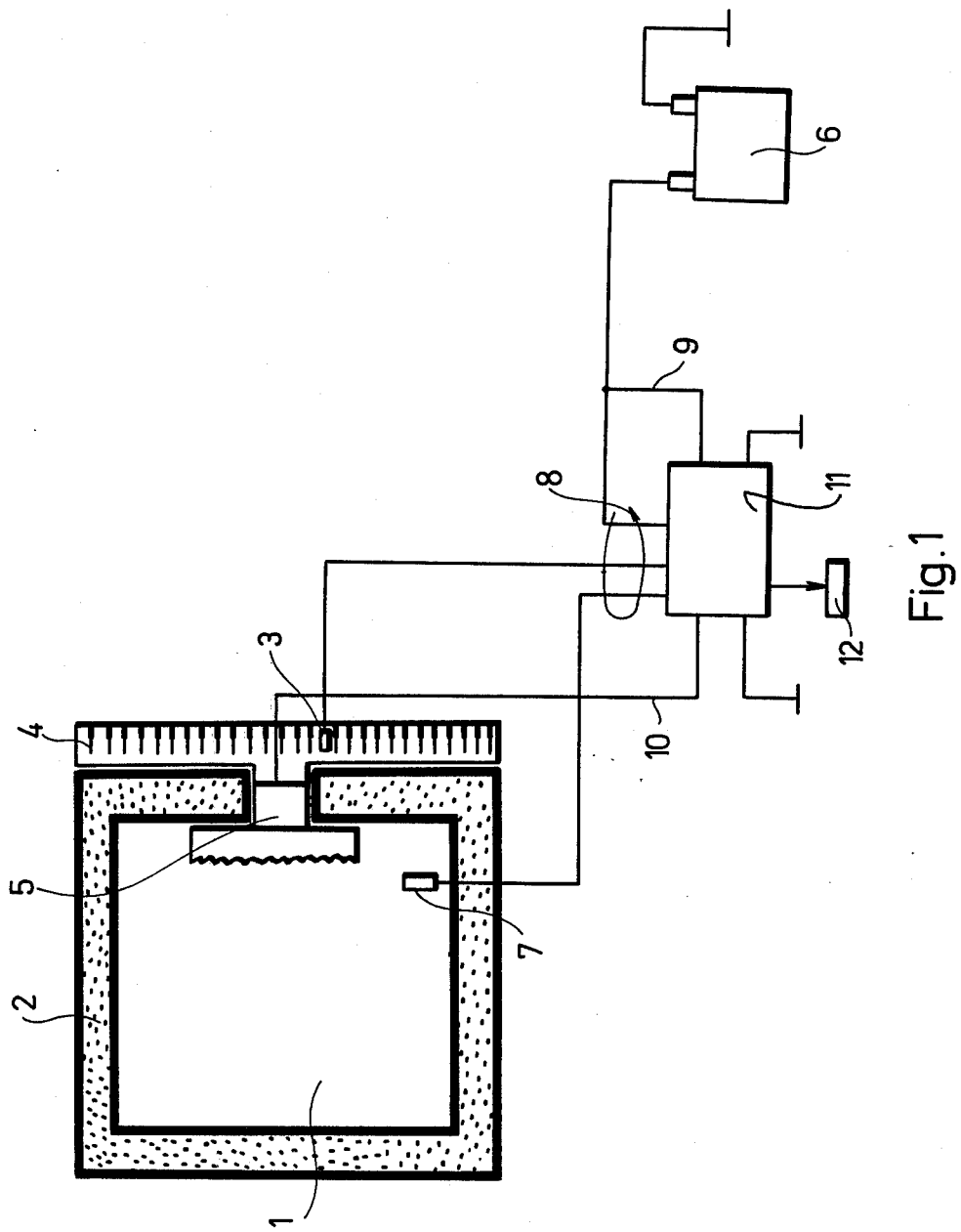

United States Patent [19]

Szabo et al.

[11] 3,973,938
[45] Aug. 10, 1976

[54] METHOD FOR TEMPERATURE CONTROL OF REFRIGERATING MACHINES OPERATING WITH THERMOELECTRIC MODULES

[76] Inventors: Kálmán Szabo, Ugocsa u. 16, H-1126 Budapest; János Völgyi, Gaal J. 13/b., H-1122 Budapest, both of Hungary

[22] Filed: Jan. 21, 1975

[21] Appl. No.: 543,225

[30] Foreign Application Priority Data

Jan. 25, 1974 Hungary............................ SA-2585

[52] U.S. Cl. ................................................. 62/3
[51] Int. Cl.² ...................................... F25B 21/02
[58] Field of Search ............................................ 62/3

[56] References Cited
UNITED STATES PATENTS

| | | |
|---|---|---|
| 2,998,707 | 9/1961 | Incess ........................ 62/3 |
| 3,091,939 | 6/1963 | Boude ........................ 62/3 |
| 3,107,324 | 10/1963 | Wright et al. ............. 62/3 |
| 3,121,998 | 2/1964 | Nagata ....................... 62/3 |
| 3,123,980 | 3/1964 | Steimel ...................... 62/3 |
| 3,242,680 | 3/1966 | Boke .......................... 62/3 |

*Primary Examiner* — Lloyd L. King
*Attorney, Agent, or Firm* — Young & Thompson

[57] ABSTRACT

A continuous temperature control system for refrigerating machines operating with thermoelectric modules, in which a heat exchanger is applied to the warm side of the thermoelectric module and the control is based on the sensed temperature of the heat exchanger and being effective to reduce the dissipation load within a predetermind range to keep the warm side temperature of the thermoelectric module below a predetermined maximum.

7 Claims, 2 Drawing Figures

METHOD FOR TEMPERATURE CONTROL OF REFRIGERATING MACHINES OPERATING WITH THERMOELECTRIC MODULES

The invention relates to a method for temperature control of refrigerating machines operating with thermoelectric modules and apparatus for the realization thereof.

This method can be applied to refrigerating machines or devices consisting of a thermally isolated cooling room, a thermoelectric module interconnecting the cooling room with the outer space and a heat exchanger or heat sink in connection with the warm-side surface of the thermoelectric module.

It is well known in the art that the cooling capacity of refrigerating machines is substantially greater than is required for maintaining an attained low temperature, when the refrigerating machine is used only to extract the heat inflowing from the outer space into the cooling room because the objects stored therein are already cooled. Due to the thermal isolation of the cooling room the amount of this inflowing heat is rather small and the refrigerating machine is operated at a small fraction of its full cooling capacity to maintain its once attained low temperature.

In small size refrigerating machines the use of complicated and expensive control units is generally avoided to keep the manufacturing costs at an acceptable level. In most of these known machines such a control system is used, in which a temperature sensing element is located within the cooled room, and if the temperature of this room sinks below a predetermined level, the sensing element produces a signal interrupting the operation of the refrigerating machine, later when the temperature rises above a still allowable second level, the operation of the refrigerating machine is started again. This known two position control system keeps the temperature of the cooling room within a predetermined group by alternatively stopping and starting the operation of the refrigerating machine.

The aforementioned control system proved to be quite acceptable when it was used in absorption and compression type refrigerating machines, but it is unsuitable for use in refrigerating machines operating with thermoelectric modules containing Peltier elements, this kind of refrigerating machines being currently more and more used especially in motor cars or other kinds of vehicles.

In refrigerating machines operating with thermoelectric modules there is a good thermal conductive connection between the warm and cold side of the thermoelectric module resulting from the good thermal conductivity of its material. If the operation of such a refrigerating machine is interrupted, a considerable amount of heat flows within a short time from the warm side of the cooling element towards the cold side. The cold side of the cooling element is in direct connection with the air located within the cooling room, therefore the reverse heat flow directly heats the cooling room. When the operation of the refrigerating machine is commenced again, the heat that thus flowed in should also be pumped out. In that case the cooling elements must perform additional and superfluous heat pumping work and this decreases the efficiency of the refrigerating machine. It should be noted, that the temperature difference that can be attained between the warm and cold sides of thermoelectric modules falls within a given range and if the warm side temperature is raised, it results in a rise in the temperature of the cooling room.

In refrigerating machines operating with thermoelectric modules it should also be taken into consideration that the temperature of the thermoelectric modules may not exceed a given maximum, otherwise the modules break down and cannot be used any more. This maximum temperature is about 85°C.

As was previously noted, refrigerating machines operating with thermoelectric modules are used mostly in motor vehicles, wherein the cooling effect should be maintained during the parking or rest positions of the vehicles, too. In such position each thermoelectric module is supplied from the battery of the respective vehicle, and this way of operation may deplete the battery within a short time.

In refrigerating machines using thermoelectric modules and controlled by the aforementioned two position control system, the warm side heat exchanger of the thermoelectric module works under worse heat adsorbing or cooling circumstances, if the vehicles is at rest. The two position control system will then maintaain the cooling system at full cooling capacity to keep the cooling room temperature unchanged and this will raise the temperature of the warm side heat exchanger. The difficulties from overheating are worsened by another circumstance, i.e. the battery is not charged in parking vehicles and the refrigerating machine operating at full capacity may soon run down the battery.

The object of the invention is to provide a control system for refrigerating machines operating with thermoelectric modules, which combines the specific demands resulting from the conditions of vehicle applications with the specific properties of thermoelectric modules and elinimates the recited disadvantages of the similar systems.

According to the invention it was discovered if the warm side heat exchanger of a thermoelectric module gets into unfavorable heat dissipation circumstances, e.g. in the rest position of the vehicle in which it is used, there is no use cooling further the already cooled room with a bad efficiency, but only such an amount of heat should be pumped out of the cooling room, which flows into it through the losses of the thermal isolation, or which can compensate the heat conducted through the material of the thermoelectric module.

According to the invention the temperature of a heat exchanger coupled to the warm side of the thermoelectric module is sensed; the voltage applied to said thermoelectric module is controlled on the basis of the sensed temperature signal within a range defined between a maximum and a predetermined minimum value exceeding zero; and the thermal load of the warm side heat exchanger is reduced by this control thus its temperature is maintained below a predetermined value.

The minimum value of the controlled voltage is adjusted to correspond to a cooling capacity adapted to compensate the internal conductive thermal loss of the thermoelectric module measured under operational conditions.

The control system according to the invention may provide a solution for saving the energy of the power supply, wherein the voltage of the power supply is sensed and if it falls below a predetermined first value, the amount of electric power applied to the thermoelectric module is reduced within said control range, and if it falls below a second predetermined value, the circuit of the thermoelectric module is broken.

From the above it can be clearly seen that the cooling of the thermoelectric module is continuously maintained, and the conductive thermal loss is compensated even at minimum power consumption. In this latter case the refrigerating machine operates as a thermally well isolated cooled box, its temperature rises very slowly. As soon as the heat dissipation improves on the warm side of the motor vehicle, e.g. as the vehicle has started, the cooling process will be continued with a good efficiency. The power consumption of this refrigerating machine reaches its minimum value just when the battery is not charged.

When the outer dissipation circumstances get worse, the thermal load heating the warm side of the thermoelectric module, unlike all known systems, is reduced and this way the overheating of the cooling element can be avoided.

The method according to the invention can be most preferably realized by means of a control arrangement, in which a sensing means is coupled to the warm side surface of the thermoelectric module to signal its temperature, the sensing means is connected to a control input of a control unit adapted to control the amount of electric power applied to the thermoelectric module within a predetermined range, the control unit is connected to an adjusting means capable of adjusting the lower limit value of said range to a value exceeding zero.

By means of this control arrangement an analogue type control can be attained and besides the sensing means coupled to the warm side heat exchanger, the extent of the cooling capacity can also be influenced by a second sensing means located within the cooling room. Under normal outer dissipation circumstances the control resulting from the operation of the first sensing means will be negligible but the second sensing means prevents overcooling. It should be emphasized, however, that the cooling process will never be stopped and the minimum cooling or heat pumping capacity will just compensate the inflowing conductive heat.

This way the inventive solution has preferably associated the specific heat dissipation properties prevailing in vehicles with the specific demands of thermoelectric modules and it provides an efficient cooling system verified by practical experiences.

Figure 2:
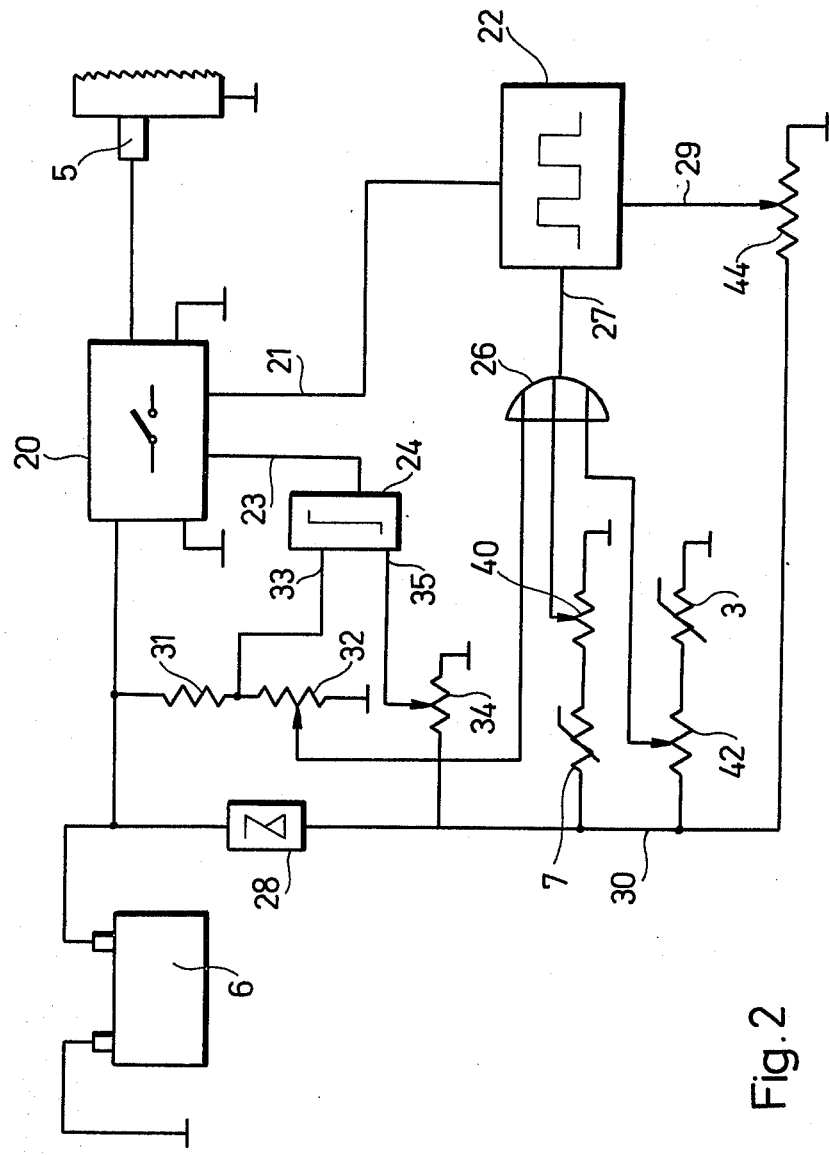

The invention will now be further discussed by way of example through some preferred embodiments, in which reference has been made to the accompanied drawings. In the drawings:

FIG. 1 shows a schematic view of the cooling system according to the invention partly in section, and FIG. 2 shows the block diagram of the control unit shown in FIG. 1.

FIG. 1 shows a refrigerating machine which can be built into a motor car and consisting of a cooling room 1, a heat insulating wall 2 encircling the cooling room and a thermoelectric module 5 extending through an opening of the wall 2 having a cold side facing towards the cooling room 1. The outer warm side of the thermoelectric module 5 is in good thermal connection with a warm side heat exchanger 4, having a ribbed outer surface and being manufactured of a good heat conductive material e.g. aluminium. The warm side heat exchanger is therefore substantially isothermic. Its temperature is indicated by an indicator 3, e.g. by a thermistor having temperature dependent electric resistance.

The refrigerating machine is mounted in such a way in the motor car, that the warm side heat exchanger 4 is cooled by the air for cabin ventilation when flowing through its intake channel. The output signal of the indicator 3 is connected to one of the control inputs 8 of a control unit 11.

The temperature of the cooling room 1 is monitored by a second indicator 7, having an output connected also to another one of the control inputs 8. A battery 6 supplies the required electric power to the refrigerating machine. The output voltage of the battery is coupled to an input 9 of the control unit 11. A third one of the control inputs 8 is connected to the output of the battery to realize a control depending on the battery voltage.

The electrical energy required for the operation of the thermoelectric module 5 is coupled via an output 10 of the control unit 11 to the thermoelectric module 5. The control unit 11 works as a controlled switch and depending on the signal amplitudes received by the control inputs 8 it keeps the electric power at its output 10 between a maximum and a predetermined minimum value exceeding zero. An adjusting means 12 serves to adjust this minimum value. In the course of the control process the maximum power coupled to the thermoelectric module 5 is limited not to exceed a predetermined maximum allowed dissipation level given in manufacturers' catalogues.

The system shown in FIG. 1 operates as follows. When the motor vehicle moves with a suitable velocity, e.g. with 30 km/h, the warm side heat exchanger 4 is satifactorily cooled. If the temperature of the cooling room has not reached the required value, e.g. a temperature of +10°C, then the control unit 11 supplies as much electric power to the thermoelectric module as is required for optimal cooling, for instance 16 watts. The heat pumped out from the cooling room 1 raises the temperature of the warm side heat exchanger 4, thus it will be about 8°C higher than the outer air temperature. At an outer temperature of 30°C the temperature of the warm side heat exchanger is about 38°C.

If the velocity of the car decreases or the car stops, the cooling properties of the warm side heat exchanger 4 become much worse, thus its temperature will increase.

The indicator 3 detects this increase in temperature and if the warm side temperature is e.g. 50°C, it controls the unit 11 to decrease the electric power coupled to the thermoelectric module 5. If the temperature of the cooling room 1 is +10°C, a cooling capacity of 2–3 watt can compensate the thermal isolation losses. The dissipation load of the warm side heat exchanger 4 decreases as the cooling capacity is reduced, this will lessen the increase of the warm side temperature. If the outer conditions are so unfavourable that the temperature of the warm side heat exchanger reaches an adjusted maximum, e.g. +70°C, then the control unit reduces the electric power of the thermoelectric module to 2–3 watts, which corresponds to a cooling capacity adapted to compensate its own internal conductive thermal losses. The cooling room 1 can then be considered as a thermally isolated box and its temperature will rise very slowly.

Let us note, however, there is only a very small probability of attaining this utmost unfavourable condition, because the reduced cooling capacity and the thus reduced thermal dissipation will help to attain thermal equilibrium at temperature lower than the upper maximum, As soon as the car starts to move again or the cooling conditions improve, the temperature of the warm side heat exchanger is lowered and the control unit 11 supplies again the power required for optimal cooling.

The indicator 7 located within the cooling room prevents this from overcooling because the control responsive to the signals thereof also reduces the electric power coupled to the thermoelectric module 5. Should the temperature of the cooling room fall below the required level, the control unit does not interrupt the operation of the thermoelectric module 5, but reduces its capacity to reach the lower trehold value of 2–3 watts when the refrigerating machine acts as an isolated box and its temperature increases very slowly. Any break in the cooling process would result in a heat inflow from the warm side of the thermoelectric module 5 into the cooling room 1 through its internal conductivity, which heat would later have to be needlessly pumped out.

The construction of the control unit 11 shown in FIG. 1 is illustrated in FIG. 2 in a more detailed way.

There is located a controlled switch 20 between the battery 6 and the thermoelectric module 5 controlled by pulses coupled to a control input 21 thereof. The operation of the controlled switch 20 can be blocked by signals coupled to its locking input 23, thus the power supply of the thermoelectric module can be broken. The control input 21 receives pulses delivered by a pulse generator 22, which is capable of delivering pulses having variable energy content, in the illustrated example variable width. The pulse width is determined by signals coupled to a modulator input 27 of the pulse generator 22. The modulator input 27 is connected with an output of an OR gate 26. The OR gate 26 has three inputs, the first of these is connected to a tap point of a potentiometer 32 delivering a signal which is proportional to the voltage of the battery 6. The second of these inputs receives the signal of the indicator 7 located within the cooling room, which is proportional to the cooling room temperature because the indicator is connected in series with a potentiometer 40 and these two series elements are connected between a line 30 having stabilized voltage and the earth. The third input of the OR gate 26 receives a voltage signal proportional to the electrical resistance of the warm side indicator 3.

The line 30 receives the electricity from a stabilized voltage source and the line 30 feeds also potentiometers 12 and 34. The potentiometer 12 is used to adjust the smallest pulse width of the pulse generator 22, which is chosen in accordance with the minimum electric power coupled to the thermoelectric module 5.

A tap point of the potentiometer 34 is connected to a reference input 35 of a comparator 24. An input 33 of the comparator 24 is coupled to a point having a signal proportional to the output voltage of the battery 6. The comparator 24 has an output connected to the locking input 23 of the controlled switch 20.

The operation of the control unit is as follows. The width of the pulses delivered by the pulse generator 22 determines the duration of the conducting cycles of the controlled switch 20 thus it prescribes the effective electric power applied to the thermoelectric module. If the pulse width is reduced, the effective power is also decreased.

The control process of the warm side indicator 3 and the cold side indicator 7 has already been described in connection with FIG. 1. To the first input of the OR gate 26 a signal is coupled which is proportional to the voltage of the battery 6. If the battery voltage is about its normal value, e.g. 14.4 V when being charged, then this control is not effective and does not take part in the determination of the power applied to the thermoelectric module 5. Should the battery voltaage fall below a first predetermined value, e.g. below 13 V, the control is actuated and even under normal operational conditions it reduces the power consumption of the refrigerating machine.

Depending on the extent of the battery voltage decrease, this power can be reduced to the predetermined minimum value of about 2–3 watts. Under these circumstances the inadvertently switched on refrigerating machine can not drain the battery even upon parking for several days, and the car can be started again.

Should the battery voltage fall below a second predetermined value, e.g. 11.4 V, then the voltage present at the input 33 of the comparator 24 reaches the voltage on its reference input 33 and the comparator switches over and breaks the power supply circuit of the thermoelectric module 5 by blocking the controlled switch 20.

It should be emphasized, however, that for the realization of the invention it is sufficient if the control is based merely on the temperature of the warm side heat exchanger 4, because all the other aforementioned controls, although improving the operation of the refrigerating machine, can be neglected for given fields of application.

The control unit 11 shown in FIG. 1 can of course be realized in several other ways than illustrated in FIG. 2. The invention cannot therefore be restricted to any of the illustrated preferred embodiments.

What we claim is:

1. A method for temperature control of refrigerating machines operating with thermoelectric modules comprising the steps of sensing the temperature of a heat exchanger coupled to the warm side of said thermoelectric module; controlling the voltage applied to said thermoelectric module on the basis of the sensed temperature signal within a range defined between a maximum and a predetermined minimum value exceeding zero; and reducing the thermal load of said warm side heat exchanger by this control by reducing the voltage applied to said thermoelectric module when said sensed temperature of said warm side heat exchanger rises above a predetermined maximum.

2. A method as claimed in claim 1, wherein said minimum value of the controlled voltage is adjusted to correspond to a cooling capacity adapted to compensate the internal conductive thermal loss of said thermoelectric module measured under operational conditions.

3. A method as claimed in claim 2, wherein the voltage of a power supply feeding said thermoelectric module is sensed and, if said sensed voltage becomes lower than a first predetermined value, the amount of electric power applied to said thermoelectric module is reduced by providing a voltage drop within said control range.

4. A method as claimed in claim 3, wherein the circuit of said thermoelectric module is broken if said sensed power supply voltage sinks below a second predetermined value lower than said first predetermined value.

5. Apparatus for temperature control of refrigerating machines operating with thermoelectric modules, in which said refrigerating machine comprises a thermally isolated cooling room, a thermoelectric module interconnecting the cooling room with the outer space and a heat exchanger connected to the warm-side surface of said thermoelectric module, characterized in that a sensing means is coupled to said warm side surface of the thermoelectric module to signal its temperature, said sensing means is connected to a control input of a control unit adapted to control the amount of electric power to said thermoelectric module within a predetermined range and to decrease said electric power when said temperature rises above a predetermined minimum, and said control unit is connected to an adjusting means to adjust the lower limit value of said range to a value exceeding zero.

6. Apparatus as claimed in claim 5, characterised in that said thermoelectric module is connected through a controlled switch to a power supply, the controlled switch is controlled by a pulse generator supplying pulses with adjustable energy contents; a first control signal determined by the resistance of said sensing means connected to said warm side heat exchanger, a second control signal determined by the resistance of a second sensing means located within said cooling room and a third control signal proportional to the voltage of said power supply are coupled to the pulse generator to adjust the energy contents of said pulses; and the minimum pulse energy of said pulse generator is adjusted by a potentiometer fed from a source having a stabilised output voltage, said source feeding also said first and second sensing means.

7. An arrangement as claimed in claim 6, characterised in that said third control signal proportional to the voltage of said power supply is connected to a first input of a comparator, and a signal proportional with the minimum allowed power supply voltage is coupled to a second reference input of said comparator which has an output connected to a blocking input of said controlled switch breaking thereby the feeding circuit of said thermoelectric module if the voltage of the power supply drops below said minimum allowed value.

* * * * *